United States Patent
Qin et al.

(10) Patent No.: US 8,355,387 B2
(45) Date of Patent: Jan. 15, 2013

(54) SYSTEM AND METHOD FOR BANDWIDTH RESERVATION PROTOCOL FOR SPATIAL REUSE IN A WIRELESS COMMUNICATION NETWORK

(75) Inventors: Xiangping Qin, San Jose, CA (US);
Pengfei Xia, Mountain View, CA (US);
Chiu Ngo, San Francisco, CA (US)

(73) Assignee: Samsung Electronics Co., Ltd., Suwon (KR)

(*) Notice: Subject to any disclaimer, the term of this patent is extended or adjusted under 35 U.S.C. 154(b) by 823 days.

(21) Appl. No.: 12/179,457

(22) Filed: Jul. 24, 2008

(65) Prior Publication Data
US 2010/0020770 A1 Jan. 28, 2010

(51) Int. Cl.
*H04J 3/00* (2006.01)
(52) U.S. Cl. ..... 370/336; 370/338; 370/468; 455/452.1; 455/452.2
(58) Field of Classification Search ............ 370/336, 370/468; 455/452.1–2
See application file for complete search history.

(56) References Cited

U.S. PATENT DOCUMENTS

| | | | |
|---|---|---|---|
| 6,640,087 B2 | 10/2003 | Reed et al. | |
| 2002/0105970 A1* | 8/2002 | Shvodian | 370/468 |
| 2005/0013267 A1 | 1/2005 | An | |
| 2005/0025101 A1* | 2/2005 | Paneth et al. | 370/336 |
| 2005/0053015 A1 | 3/2005 | Jin et al. | |
| 2005/0141451 A1 | 6/2005 | Yoon et al. | |
| 2005/0143133 A1 | 6/2005 | Bridgelall | |
| 2005/0152394 A1 | 7/2005 | Cho | |
| 2006/0268792 A1* | 11/2006 | Belcea | 370/338 |
| 2007/0002876 A1 | 1/2007 | Berkman et al. | |
| 2007/0099668 A1 | 5/2007 | Sadri et al. | |
| 2007/0101367 A1* | 5/2007 | Lee et al. | 725/39 |
| 2007/0204205 A1 | 8/2007 | Niu et al. | |
| 2007/0230338 A1 | 10/2007 | Shao et al. | |

(Continued)

FOREIGN PATENT DOCUMENTS
EP 1478135 A1 11/2004
(Continued)

OTHER PUBLICATIONS

Choi et al., "IEEE 802.11e Contention-Based Channel Access (EDCF) Performance Evaluation," Seoul National University and Philips Research USA.

(Continued)

*Primary Examiner* — Ricky Ngo
*Assistant Examiner* — Richard K Chang
(74) *Attorney, Agent, or Firm* — Kenneth L. Sherman, Esq.; Michael Zarrabian, Esq.; Sherman & Zarrabian LLP (57) ABSTRACT

A system and method for providing spatial reuse in a wireless network for communicating compressed and uncompressed audio/video is disclosed. A bandwidth reservation request for data communication with a receiver to a coordinator is transmitted. A first response indicating availability of the receiver for the data communication is received. A channel is listened to by a station for channel busy indication (CBI) messages transmitted by other stations in the wireless network. A local channel occupation report comprising data indicative of one or more time periods during which one or more other stations in the wireless network are scheduled to transmit data messages is transmitted to the coordinator. A second response comprising data indicative of one or more allocated channel time slots is received. Audio and/or video (A/V) data is transmitted to the receiver during the allocated channel time slots.

31 Claims, 9 Drawing Sheets

U.S. PATENT DOCUMENTS

| | | | |
|---|---|---|---|
| 2007/0240191 | A1 | 10/2007 | Singh et al. |
| 2007/0253391 | A1 | 11/2007 | Shao et al. |
| 2008/0240146 | A1 | 10/2008 | Singh et al. |
| 2008/0273600 | A1 | 11/2008 | Singh et al. |
| 2009/0080366 | A1 | 3/2009 | Shao et al. |
| 2009/0109938 | A1 | 4/2009 | Singh et al. |

FOREIGN PATENT DOCUMENTS

| | | |
|---|---|---|
| EP | 1484867 A3 | 12/2004 |

OTHER PUBLICATIONS

Courville et al, "Evaluation of centralized adhoc network architecture (CANA)," BAI cluster workshop Mar. 2004, IST BroadWay project, Jun. 1, 2004, 17 pages.
Draves et al., "Routing in multi-radio, multi-hop wireless mesh networks," 15 pages, MobiCom '04, Sep. 26-Oct. 1, 2004.
Hachman; CE giants back Amimon's Wireless HDTV tech, PCMAG.COM, Jul. 23, 2008.
Heinzelman et al., "Energy efficient communication protocol for wireless microsensor networks," Proc. The 33rd Hawaii International Conference on System Science, Hawaii, U.S.A., Jan. 2000, pp. 1-10.
Hitachi et al., High-Definition Multimedia Interface (HDMI) Specifications version 1.2, Aug. 22, 2005, pp. 1-214.
Iannone et al., "Can multi-rate radios reduce end-to-end delay in mesh networks? A simulation case study," Mesh Networking: Realizing the Wireless Internet (Meshnets), Jul. 2005, pp. 1-10.
IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).
IEEE P802.11e/D13.0, Amendment: Medium Access Control (MAC) Quality of Service (QoS) Enhancements, Jan. 2005, pp. 1-198.
IEEE P802.11nTM/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 4: Enhancements for Higher Throughput, IEEE, Sep. 2007, pp. 1-544.
IEEE Wireless LAN Edition (2003), "A compilation based on IEEE Std 802.11TM-1999 (R2003) and its amendments," Sep. 19, 2003, pp. 1-706.
IST Broadway, "A 5/60GHz hybrid system concept", 12 pages; available at www.ist-browadway.org/documents/broadway-broadband_air_interfaces_cluster.pdf (last visited on Apr. 24, 2008).
Madhow, "MultiGigabit millimeter wave communication: System concepts and challenges," Deparment of Electrial and Computer Engineering, UCSB, Workshop Jan./Feb. 2008, pp. 193-196.
Maruhashu et al., "Wireless uncompressed-HDTV-signal transmission system utilizing compact 60-GHz-band transmitter and receiver," Microwave Symposium Digest, 2005 IEEE MTT-S International, Jun. 12-17, 2005.
MBOA, Distributed Medium Access Control (MAC) for wireless networks, WiMedia Alliance, Draft 0.99, Nov. 1, 2005.
NEC develops compact millimeter-wave transceiver for uncompressed HDTV signal transmission, NE Asia Online, Apr. 5, 2005.
Perahia et al. "Next Generation Wireless LANs: Throughput, Robustness, and Reliability in 802.11n," Cambridge University Press, 2008, pp. 1-10.
Ramachandran et al., "Interference-aware channel assignment in multi-radio wireless mesh networks," Infocom 2006.
Ros et al., "Cluster-based OLSR extensions to reduce control overhead in mobile Ad hoc networks," International wireless Communications and Mobile Computing Conference (IWCMC 2007) Department of Information and Communications Engineering, University of Murcia, pp. 202-207, Aug. 12-16, 2007, Honolulu, Hawaii, U.S.A.
Stephens et al., Joint Proposal: High throughput extension to the 802.11 Standard: MAC, doc.: IEEE 802.11-05/1095r2, Nov. 16, 2005, pp. 1-37.
Van Veen et al., Beamforming: A Versatile Approach to Spatial Filtering, IEEE ASSP Magazine, Apr. 1988, 5: 4-24.
Villasenor-Gonzalez et al., "HOLSR: A hierarchical proactive routing mechanism for mobile Ad hoc networks," IEEE Communications Magazine (Jul. 2005).
WirelessHD Specifications Rev. 0.1, Jul. 12, 2006, pp. 1-175.
Zhu et al., A Power-Aware and Qos-Aware Service Model on Wireless Networks, INFOCOM 2004, 23rd Annual Joint Conference of the IEEE Computer and Communication Societies, Mar. 2004, 2: 1393-1403.
International Search Report dated Jun. 27, 2007 for PCT/KR2007/001509, filed Mar. 28, 2007.
International Preliminary Report on Patentability and Written Opinion dated Sep. 30, 2008 for PCT/KR2007/001509, filed Mar. 28, 2007.
International Search Report dated Jan. 17, 2008 for PCT/KR2007/002445, filed May 18, 2007.
Hachman, "CE Giants back Amimon's Wireless HDTV Tech," PCMAG.com, 1 page (Jul. 23, 2008).
IEEE 802.11: Wireless LAN Medium Access Control (MAC) and Physical Layer (PHY) Specifications, Jun. 12, 2007.
IEEE 802.15.3: Wireless Medium Access Control (MAC) and Physical Layer (PHY) Specifications for High Rate Wireless Personal Area Networks (WPANs), Sep. 29, 2003.
"NEC develops compact millimeter-wave transceiver for uncompressed HDTV signal transmission," *NE Asia Online*, Apr. 5, 2005, (Downloaded from http://neasia.nkkeibp.com/topstory/000913 on Sep. 29, 2006.).
WirelessHD Specification Version 1.0 Overview, Oct. 9, 2007, 77 pages.

* cited by examiner

SYSTEM AND METHOD FOR BANDWIDTH RESERVATION PROTOCOL FOR SPATIAL REUSE IN A WIRELESS COMMUNICATION NETWORK

BACKGROUND OF THE INVENTION

1. Field of the Invention

The present invention relates to wireless transmission in a wireless network, and in particular, to bandwidth reservation in a wireless infrastructure network.

2. Description of the Related Technology

With the proliferation of high quality video, an increasing number of electronic devices, such as consumer electronic devices, utilize high definition (HD) video which can require about 1 Gbps (giga bits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be in error and the picture quality can be lowered.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues and the bandwidth is not enough to carry the uncompressed HD signals.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of providing spatial reuse in a wireless network for communicating compressed or uncompressed video/audio, the method comprising transmitting a bandwidth reservation request for data communication with a receiver to a coordinator, receiving a first response indicating availability of the receiver for the data communication, listening to a local channel for channel busy indication (CBI) messages transmitted by other stations in the wireless network, transmitting a local channel occupation report comprising data indicative of one or more time periods during which one or more other stations in the wireless network are scheduled to transmit data messages to the coordinator; receiving a second response comprising data indicative of one or more allocated channel time slots, and transmitting audio and/or video (A/V) data to the receiver during the one or more allocated channel time slots.

In another embodiment, there is a method of providing a spatial reuse in a wireless network for communicating compressed or uncompressed audio/video, the method comprising receiving a bandwidth reservation request from a transmitter for data communication with a receiver, determining that the receiver is available for data communication, transmitting a first response indicating availability of the receiver to the transmitter, receiving a local channel time occupation report comprising data indicative of one or more time periods during which one or more other stations in the wireless network are scheduled to transmit data messages, allocating a bandwidth for the data communication between the transmit and receivers based at least in part on the local channel time occupation report, and transmitting a second response comprising data indicative of one or more allocated channel time slots to the transmitter.

In another embodiment, there is a method of providing a spatial reuse in a wireless network for communicating compressed or uncompressed audio/video, the method comprising receiving a probe inquiring availability for data communication with a transmitter, transmitting a probe response indicating availability, listening to a channel for channel busy indication (CBI) messages transmitted by one or more other stations in the wireless network, transmitting a local channel occupation report comprising data indicative of one or more time periods during which one or more other stations in the wireless network are scheduled to transmit to the coordinator, and waiting for transmission of audio and/or video (A/V) data from the transmitter.

In another embodiment, there is a system for providing spatial reuse in a wireless network for communicating uncompressed video, the system comprising a processor configured to transmit a bandwidth reservation request for data communication with a receiver to a coordinator, receive a first response indicating availability of the receiver for the data communication, listen to a channel for channel busy indication (CBI) messages transmitted by other stations in the wireless network, transmit a local channel occupation report comprising data indicative of one or more time periods during which one or more other stations in the wireless network are scheduled to transmit interfering data messages to the coordinator, receive a second response comprising data indicative of one or more allocated channel time slots; and an antenna or an antenna array in data communication with the processor and configured to transmit audio and/or video (A/V) data during the one or more allocated channel time slots.

In another embodiment, there is a system for providing a spatial reuse in a wireless network for communicating compressed or uncompressed audio/video, the system comprising a processor configured to receive a bandwidth reservation request from a transmitter for data communication with a receiver, determine that the receiver is available for data communication, transmit a first response indicating availability of the receiver to the transmitter, receive a local channel time occupation report from at least one of the transmitter and receiver, allocate bandwidth for the data communication between the transmitter and the receiver based at least in part on the local channel time occupation report, and transmit a second response comprising data indicative of the allocated bandwidth to the transmitter; and an antenna or an antenna array in data communication with the processor and configured to communicate control data with the transmitter and the receiver.

In another embodiment, there is a system for providing a spatial reuse in a wireless network for communicating compressed or uncompressed video, the system comprising a processor configured to receive a probe inquiring availability for data communication with a transmitter, transmit a probe response indicating availability, listen to a channel for channel busy indication (CBI) messages transmitted by other stations in the wireless network, transmit a local channel occupation report comprising data indicative of one or more time periods during which one or more other stations in the wireless network are scheduled to transmit data messages to the coordinator, and wait for transmission of audio and/or video (A/V) data from the transmitter; and an antenna or an antenna array in data communication with the processor and configured to receive audio and/or video (A/V) data from the transmitter.

In another embodiment, there is a computer-usable medium in a system for wireless communication of compressed or uncompressed audio/video having computer readable code comprising instructions for transmitting a bandwidth reservation request for data communication with a receiver to a coordinator, receiving a first response indicating availability of the receiver for the data communication, listening to a local channel for channel busy indication (CBI) messages transmitted by other stations in the wireless network, transmitting a local channel occupation report comprising data indicative of one or more time periods during which one or more other stations in the wireless network are scheduled to transmit data messages to the coordinator, receiving a second response comprising data indicative of one or more allocated channel time slots, and transmitting audio and/or video (A/V) data to the receiver during the one or more allocated channel time slots.

DETAILED DESCRIPTION OF CERTAIN INVENTIVE EMBODIMENTS

Certain embodiments provide a method and system for bandwidth reservation for a wireless network that supports isochronous transmissions such as audio and video applications. In some embodiments, the throughput of the wireless network is improved by use of a spatial reuse scheme to be described below. In some embodiments, the spatial reuse scheme includes an infrastructure mode in which a coordinator performs bandwidth reservations for all devices in the network.

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments including systems and methods of data processing in wireless communication devices for communication of uncompressed or compressed audio/video data will be described. Video data may include one or more of motion video, still images, or any other suitable type of visual data. In particular, various embodiments representing novel spatial reuse protocol for efficient communication of uncompressed video data will be described.

Figure 1:
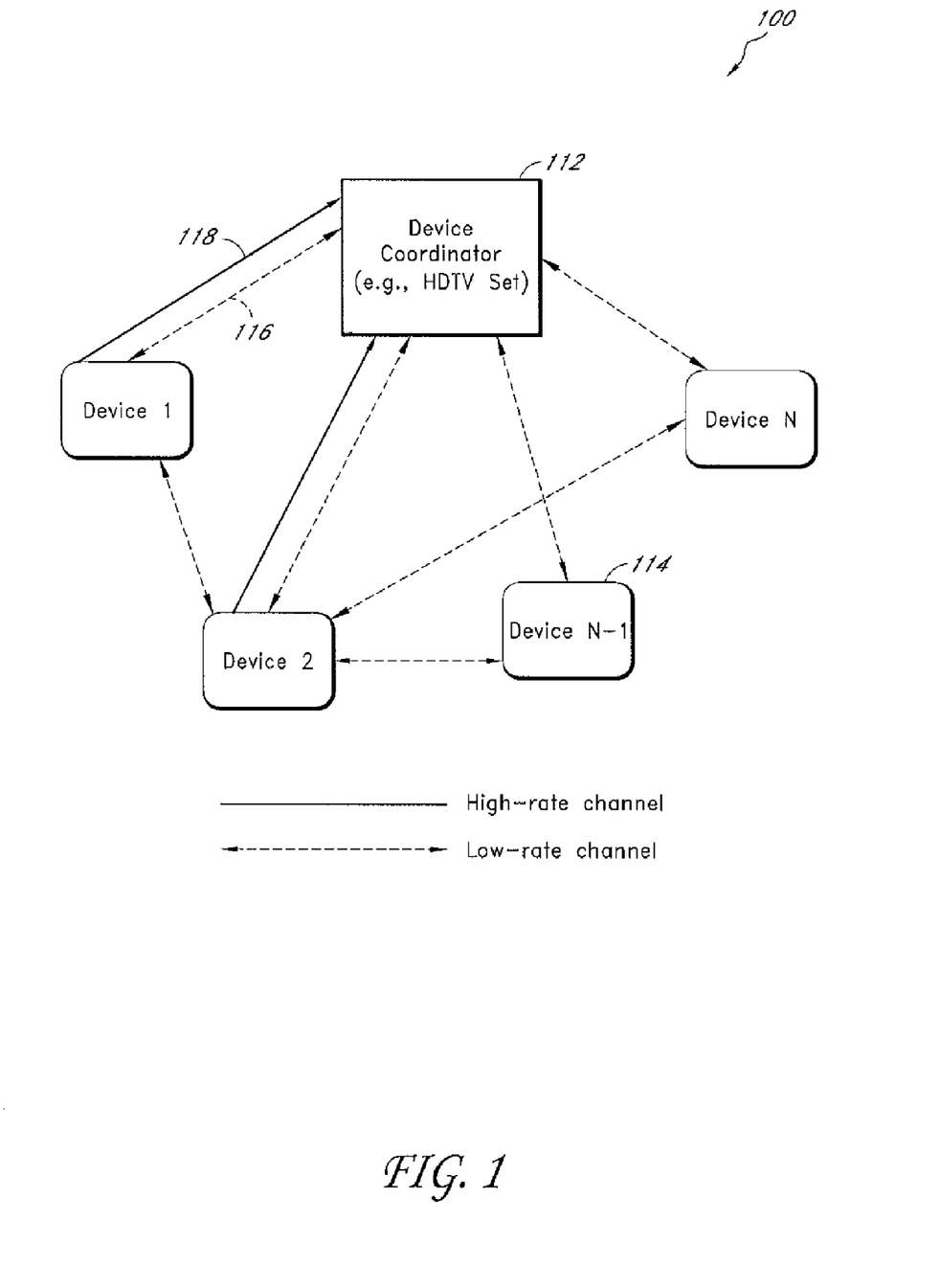
FIG. 1 is a functional block diagram of an exemplary configuration of a wireless network that implements uncompressed HD video transmission between wireless devices according to one embodiment of the system and method.

Exemplary implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 . . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (referred to as "receiver 112"), and the station 114 is a sender of the video information (referred to as "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, a digital camera, a camcorder, and so forth.

Figure 2:
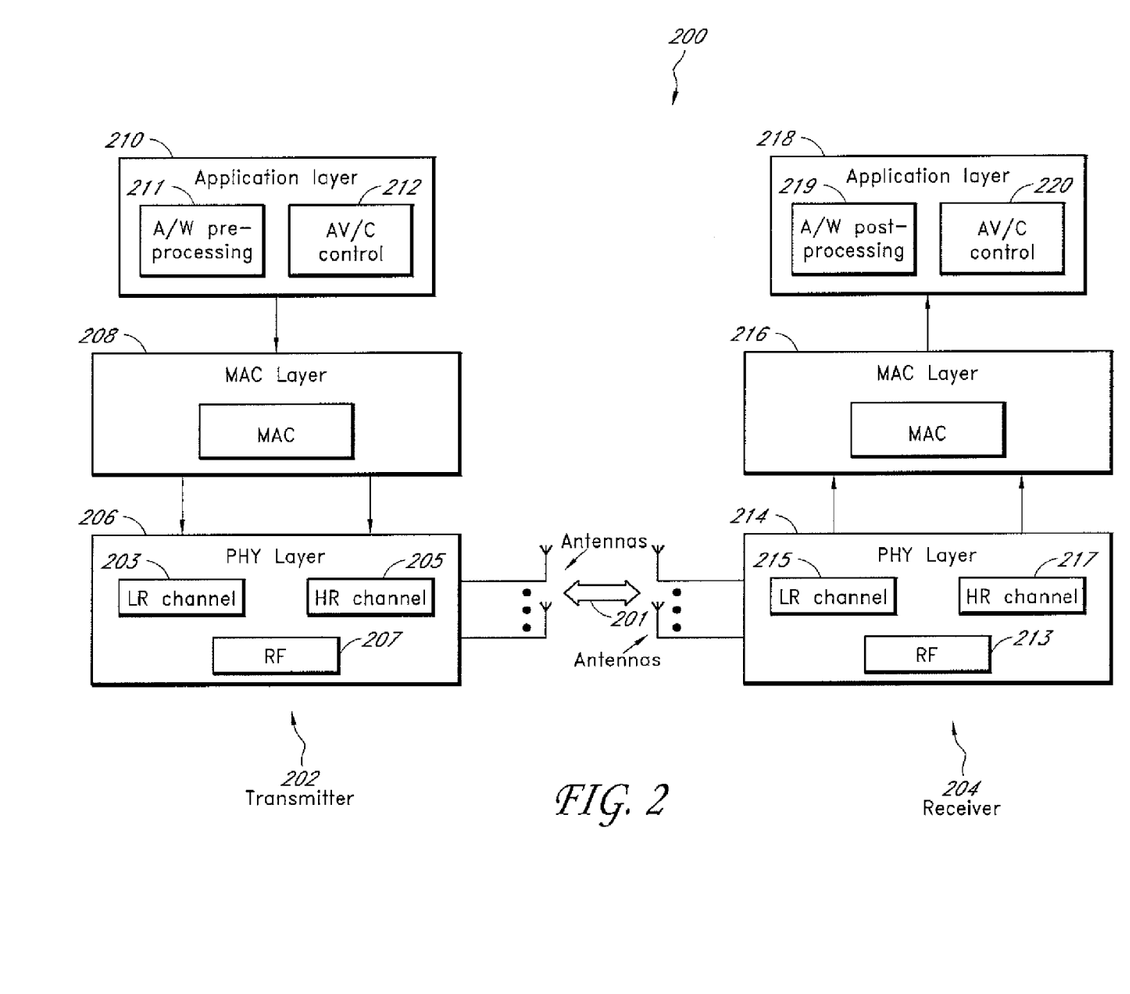
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
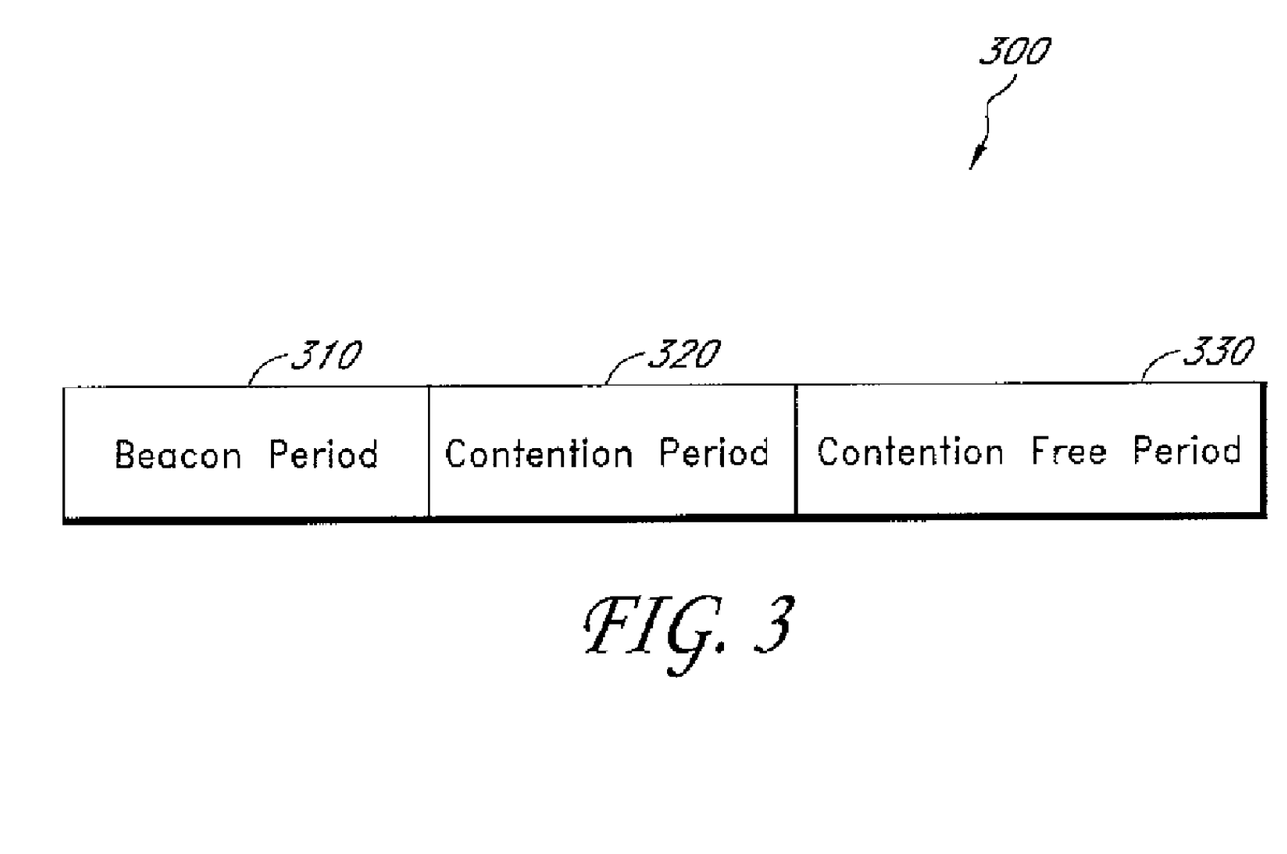
FIG. 3 shows an example superframe comprising sub periods that can be used in a wireless network such as illustrated in FIG. 1.

FIG. 3 shows an example superframe 300 comprising sub periods that can be used in a wireless network such as illustrated in FIG. 1. The example superframe 300 is divided into three parts: beacon period 310, contention period 320, contention free period 330. In the beacon period 310, the device coordinator 112 can communicate with devices or stations 114 (FIG. 1). Beacon transmissions can be directional or omni-directional. In the contention period 320, the stations 114 transmit network association, bandwidth reservation request and other control commands. In the contention free period 330, the device coordinator 112 can schedule transmissions of data, especially delay-sensitive data such as A/V data. The contention free period 330 includes reserved and unreserved channel time blocks (CTBs), where some of the CTBs correspond to reserved time slots during which one station transmits A/V data to another station.

Figure 4:
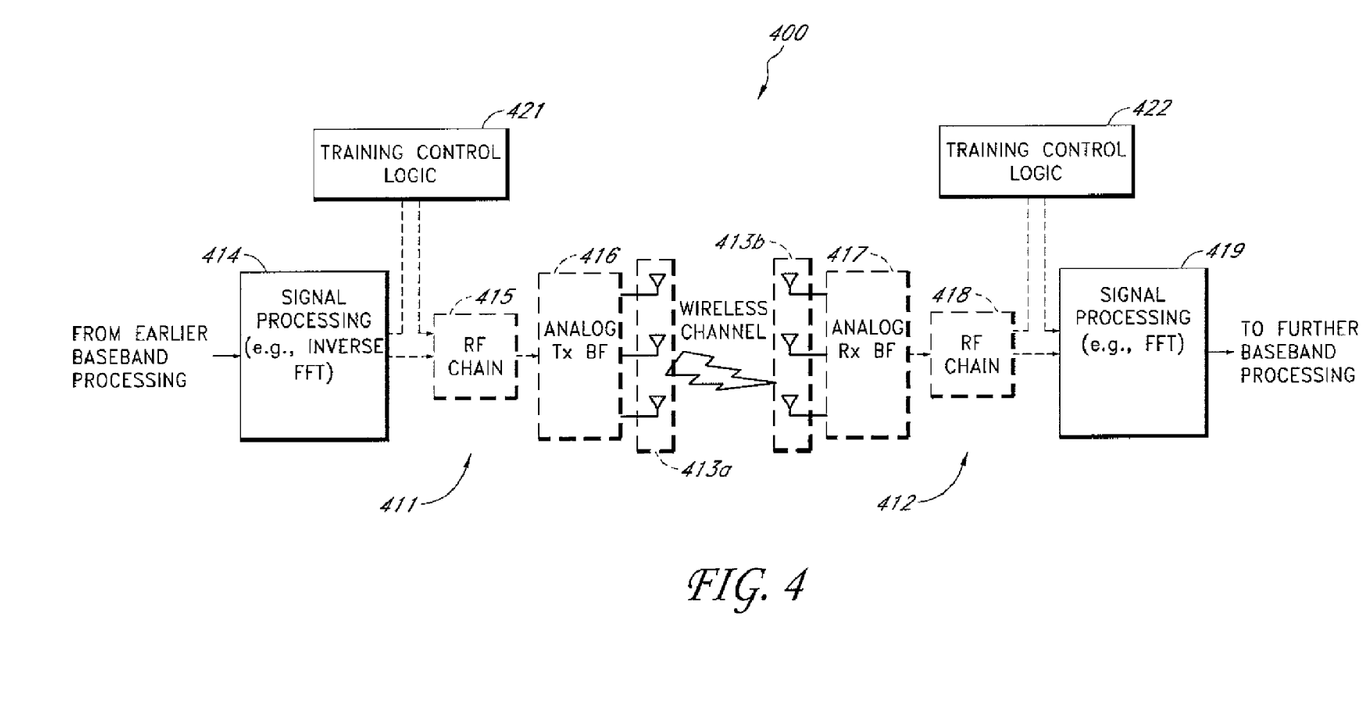
FIG. 4 is a functional block diagram of an example beamforming wireless system comprising two beamforming station—a transmitter and a receiver—that are configured to perform an antenna training session prior to transmitting audio and/or video (A/V) data.

In certain embodiments, before a pair of stations (e.g. the transmitter and receiver illustrated in FIG. 4) engage in data communications, the stations perform an antenna training process in order to improve signal-to-noise ratio. In some embodiments, each of the transmitter and receiver contains a beamforming antenna array comprising multiple antenna elements. In some embodiments, the antenna array is a phased antenna array. In other embodiments, the antenna array is a switched antenna array. The antenna training may include training of the antenna coefficients at both the transmitter and receiver. As used herein, beamforming includes selecting or changing a receive/transmit directionality of an array of antennas. FIG. 4 is a functional block diagram of an example beamforming wireless system 400 comprising two beamforming stations—a transmitter 411 and a receiver 412—that are configured to perform an antenna training session prior to transmitting A/V data. The transmitter and receivers 411 and 412 include antenna arrays 413a and 413b, respectively. In the illustrated example, the beamforming wireless system 400 is an analog beamforming wireless system. However, it will be appreciated that the system 400 can be a digital beamforming wireless system.

The transmit (TX) function of the transmitter 411 includes a signal processing module 414. The signal processing module 414 receives a baseband signal, that has undergone an earlier baseband processing, and may perform an inverse Fast Fourier Transform (IFFT) which converts the signal from the frequency domain into a time domain digital signal. In certain embodiments, the signal processing module 414 can include a processor (not shown), e.g., a microprocessor, a digital signal processor (DSP), a programmable gate array (PGA) and the like, for performing the IFFT. The digital signal is then converted into an analog waveform by a digital to analog (D/A) function of an RF chain 415, and then transmitted to the receiver 412 via an antenna array 413a after analog beamforming (BF) by an analog TX BF function module 416. The transmitter 411 can also include a training control module 421 that is used during an antenna training session. During an antenna training session, the digital signal output from the signal processing module 414 is bypassed to the training control module 421 where an iterative antenna training algorithm can be used to construct antenna beamforming vectors. During the antenna training session, the training control module 421 generates one or more training sequences. The training sequence then flows into the RF chain 415, where it is converted into an analog waveform, and transmitted to the receiver 412 as described above.

The receive (RX) function of the receiver 412 includes an analog RX BF function module 417. A signal transmitted from the transmitter 411 is received by the receiver 412 via the antenna array 413b. The received signal flows into the analog RX BF function 417. The analog output signal from the analog RX BF function 417 is converted to a digital signal in an RF chain 418, and may then converted to a frequency domain baseband signal by, for example, an FFT module inside a signal processing module 419. The frequency domain baseband signal is then output for a further baseband processing. The receiver 412 can also include its own training control module 422 that is used during an antenna training session. During the antenna training session, a digital signal representing a training sequence received from the transmitter 411 is bypassed to the training control module 422 where at least a part of an iterative antenna training algorithm for constructing a beamforming vector is applied.

Figure 5:
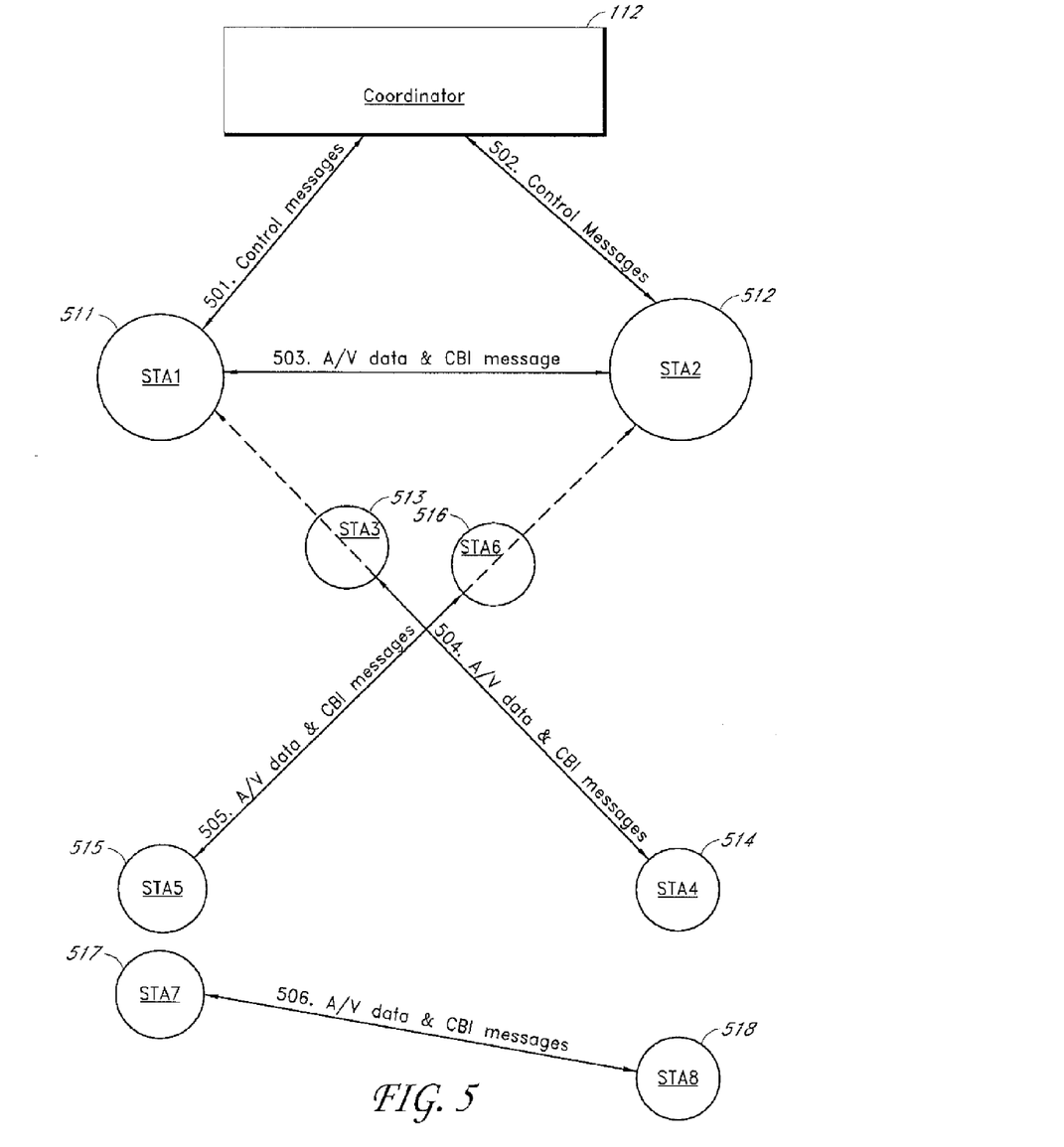
FIG. 5 is a schematic diagram illustrating an example spatial reuse bandwidth reservation protocol in a wireless network.

FIG. 5 is a schematic diagram illustrating an example spatial reuse bandwidth reservation (SRBR) protocol in a wireless network 500. The wireless network 500 includes a coordinator 112 and communication stations 511, 512, 513, 514, 515, 516, 517 and 518. The SRBR protocol utilizes periodical channel busy indication (CBI) messages, e.g., Request-To-Send (RTS) and Clear-To-Send (CTS), transmitted by various existing communication pairs in the network to allocate available bandwidth for a new communication pair. One or both of the prospective transmitter and receiver in the new communication pair listen to an assigned local channel for the CBI messages, form local channel time occupation (LCTO) reports, and transmit the reports to the coordinator. Based at least in part on the LCTO reports, the device coordinator schedules the transmissions and achieves spatial reuse. As used herein, spatial reuse refers to allowing multiple non-interfering stations in a wireless network to transmit data simultaneously and share the same frequency band.

In certain embodiments, the SRBR protocol adopts an infrastructure mode in which the device coordinator 112 is responsible for bandwidth reservation for all stations in the network. For the purpose of the following discussion, assume that the first station (STA1) 511 wishes to form a new communication pair with the second station (STA2) 512 so that the former can send A/V data 503 to the latter. Also assume that the three additional pairs of stations, namely, the third and fourth stations (STA3, STA4) 513, 514, the fifth and sixth stations (STA5 and STA6) 515, 516, and the seventh and eighth stations (STA7 and STA8) 517, 518 have already formed communication pairs. Also assume that the STA4 514, the STA6 516, and the STA9 518 are transmitting A/V data 504, 505, 506 to the STA3 513, the STA5 515, and the STA7 517, respectively, at allocated time slots.

The process for forming a new communication pair between the first station (STA1) 511 and the second station (STA2) 512 begins when the STA1 transmits a bandwidth reservation request to the coordinator 112. During a formation process, the prospective stations, e.g., STA1 and STA2, send and receive a plurality of control messages 501, 502, such as the bandwidth reservation request and responses, to and from the coordinator 112 to allow the coordinator to allocate bandwidth for the pair. The bandwidth reservation request can include the address of the STA2 512 with which the STA1 511 wishes to form a communication pair. Upon receiving the bandwidth reservation request, the coordinator 112 transmits a probe message for availability to the STA2 512. The probe message inquires about availability of the STA2 512 to form a communication pair with the STA1 511. In certain embodiments in which the STA1 and the STA2 includes directional antennas, e.g., beamforming antenna array(s) such as the antenna arrays 413a, 413b shown in FIG. 4, the probe message may also include, or be accompanied by, a request for an antenna training. Upon receiving the probe message, the STA2 512 transmits a probe response. If the STA2 is available, e.g., idle or capable of taking on additional communication pairs, the probe response indicates an acceptance. On the other hand, if the STA2 is not available to form a communication pair with the STA1, the probe response indicates a rejection.

Upon receiving the probe response, the coordinator 112 transmits an availability response to the STA1 511 indicating that the STA2 512 is or is not available to form a communication pair. In those embodiments in which the STA1 and STA2 include directional antennas, the availability response can also indicate a reserved time period for performing the antenna training assuming that the STA2 512 is available. In some embodiments, the availability response indicating the reserved time period for performing the antenna training can also be received by the STA2 512 so that the station would know that the antenna training will be initiated at the reserved time period. After receiving the availability response, the STA1 and STA2 511, 512 can perform an antenna training in which their respective directional antenna is trained and/or beamformed based on an antenna training algorithm as described above with respect to FIG. 4. Often, additional antenna trainings are performed during AV transmissions in order to maintain antenna training accuracy and quality, since a variation in the channel over time could degrade or destroy the effectiveness of the trained antennas.

After completion of the antenna training, the first and second stations (STA1 and STA2) 511, 512 enter a channel listening period during which they, using their trained antennas, listen to the assigned local channel for channel busy indication (CBI) messages periodically transmitted by other stations in the wireless network 500. The periodic CBI messages can include Request-To-Send (RTS) messages and Clear-To-Send (CTS) messages transmitted by other stations in the network the STA3, STA4, STA5, STA6, STA7, and STA8 stations, 513, 514, 515, 516, 517, 518. When stations in a wireless network transmit isochronous data, the transmitters can transmit periodic RTS messages and the receivers can respond to the RTS messages by transmitting periodic CTS messages. Such RTS and CTS messages are often transmitted at the beginning of data transmission time slots, e.g., channel time blocks (CTBs), as discussed above with respect to FIG. 3.

In the example topology shown in FIG. 5, the periodic RTS messages from the STA4 514 can be received or heard by the STA1 511 due to the geometrical arrangement. Similarly, the periodic CTS messages from the STA5 515 can be received or heard by the STA2 512. However, the periodic CTS messages from the STA3 513 and the periodic RTS messages from the STA6 516 cannot be received or heard by either the STA1 511 or the STA2 512 due to the geometrical arrangement. Similarly, periodic CTS messages—RTS and CTS—from the STA7 517 and the STA8 518 cannot be received or heard by either the STA1 or the STA2. Therefore, allocated time slots, e.g., CTB blocks, during which the A/V data 506 are transmitted between the STA7 and the STA8 simultaneously, the A/V data 503 is communicated from the STA1 511 to the STA2 512. These two streams can spatial reuse the same frequency channel. This, of course, assumes that there is no other station in the network that transmits A/V data that can be heard by either the STA1 511 or the STA2 512 during those time slots.

Based on the CBI, e.g., RTS and/or CTS, messages heard during the channel listening period, which may last one to several superframe cycles, the first and second stations (STA1, STA2) 511, 512 generate and transmit local channel time occupation (LCTO) reports to the coordinator 112. The LCTO reports include data indicative of occupied time periods during which one or more other stations—stations other than the transmitter and receiver—transmit data messages that can interfere with data transmissions and receptions by the transmitter and receiver. For example, a RTS or CTS message that is heard by a station, e.g., STA1 or STA2, can include a time duration field that indicates the duration of the subsequent interfering data stream by another station. Then the station that hears the RTS or CTS message will mark the occupied time periods and include them in the LCTO report. In certain embodiments, the reports can include data indicative of particular time slots, e.g., channel time blocks (CTBs), during which another station is scheduled to transmit an interfering data stream.

Based at least in part on the LCTO reports, the coordinator 112 determines available bandwidth, e.g., time slots, during which the STA1 511 can transmit and the STA2 can receive A/V data 503 with no interferences from other stations. It needs to be noted that the available channel time slots are not necessarily unallocated time slots, although they can be. For example, in the topology shown in FIG. 5, data transmissions between seventh and eighth stations (STA7 517 and STA8 518) would not interfere with data transmissions between the STA1 512 and the STA2 512. Therefore, even if the time slots have been previously allocated for transmission of the A/V data 506 between the STA7 and the STA8, the time slots can be "reused," for transmission of the A/V data 503 between the STA1 and the STA2.

After determining available time slots, the coordinator 112 allocates bandwidth by selecting one or more available channel time slots and transmits a bandwidth allocation response indicating the allocated time slots to the STA1 511. In some embodiments, the bandwidth allocation response may be received also by the STA2 512 so that the station would know when to expect data transmissions from the STA1 511. After receiving the bandwidth allocation response, the STA1 511 commences transmission of A/V data 503 to the second station 512 at the allocated time slots. In addition, the STA1 and STA2 transmit their own RTS and CTS messages periodically for other stations to detect the ongoing traffic.

Figure 6:
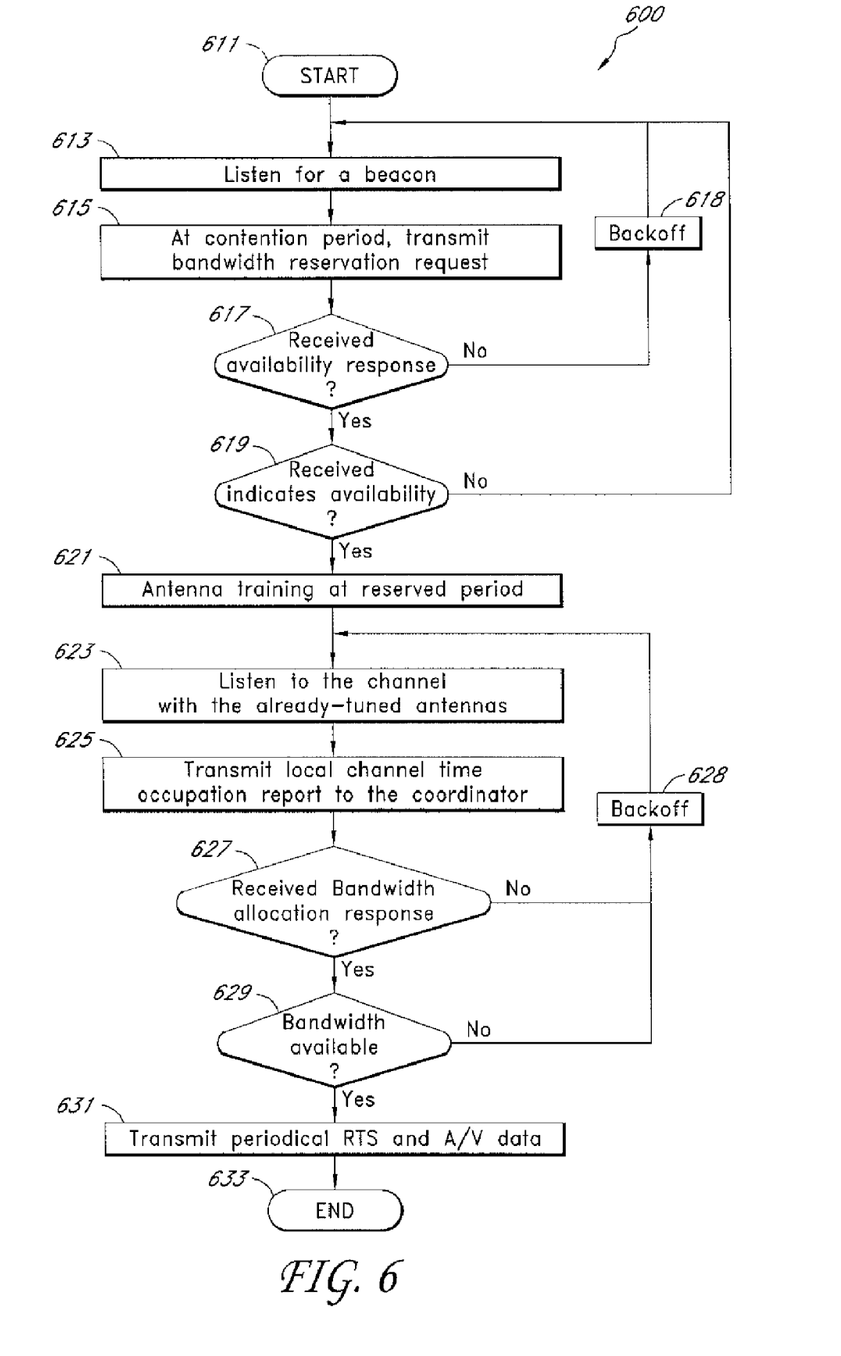
FIG. 6 is a flowchart illustrating an example process for a spatial reuse bandwidth reservation protocol from the point-of-view of a transmitter.

FIG. 6 is a flowchart illustrating an example process 600 for a spatial reuse bandwidth reservation protocol from the point-of-view of a transmitter, e.g., the first station 511 (FIG. 5). During the following discussion, frequent references will be made to various stations and data and message transmissions discussed above with respect to FIG. 5. The process 600 starts at a start state 611 and advances to a state 613, where the first station (STA1) 511, which desires to send A/V data 503 to the second station (STA2) 512, listens for a beacon transmitted during a beacon period 310 (FIG. 3). The process 600 proceeds to a state 615, where the STA1 511 transmits a bandwidth reservation request to the coordinator 112 during a contention period 320 immediately following the beacon period 310 (FIG. 3). The bandwidth reservation request can include the address of the STA2 512. The process 600 proceeds to a decision state 617, where it is queried whether the STA1 511 has received an availability response from the coordinator 112 within a preset time interval, e.g., within a predetermined number of superframe cycles. If the answer is no, the process 600 proceeds to a state 618, where the STA1 511 terminates or backs off from its attempt to send the bandwidth reservation request and loops back to the state 613, where it listens for another beacon. If the answer is yes at decision state 617 (an availability response received), the process 600 proceeds to a decision state 619, where it is queried whether the availability response 504 indicates that the STA2 512 is available. If the answer is no, the process 600 loops back to the sate 613, where the STA1 511 listens for another beacon.

If the answer to the query of the decision state 619 is yes (the availability response indicates that the second station 512 is available), the process 600 proceeds to a state 621, where the first station 511 performs an antenna training at a reserved period indicated in the availability response 504. During the reserved period, the directional antennas for the STA1 511 is tuned or beamformed. The process 600 then proceeds to a state 623, where the first station 511 listens for any CBI messages, e.g., RTS or CTS messages transmitted by other stations in the wireless network, using the tuned antenna array for a predetermined channel listening period. In one embodiment, the channel listening period lasts one superframe. In other embodiments, the channel listening period can last several superframes. Based on information contained in the CBI messages that are received or heard during the channel listening period, if any, the first station 511 generates a local channel time occupation (LCTO) report 507 that includes, for example, time slots during which one or more other stations in the wireless network are scheduled to transmit interfering data messages. In the illustrated example of FIG. 5, the LCTO report can include data indicative of occupied time periods obtained from the periodic RTS messages transmitted by the STA4 514. The process 600 then proceeds to a state 625, where the LCTO report is transmitted to the coordinator 112.

The process 600 proceeds to a decisional state 627, where it is queried whether a bandwidth allocation response is received from the coordinator 112. If the answer is no, the process 600 proceeds to a state 628, where the first station 511 terminates or backs off from its attempt to transmit A/V data and loops back to the state 623, where it again listens to the channel for CBI messages and generates another LCTO report to be sent to the coordinator 112. If the answer to the query for the decision state 627 is yes (a bandwidth allocation response received), the process 600 proceeds to another decision state 629, where it is queried whether the bandwidth allocation response indicates availability of bandwidth, e.g., one or more allocated time slots, during which the first station 511 can transmit A/V data to the second station 512 without being interfered by transmissions from other stations in the wireless network. If the answer at the decision state 629 is no, the process proceeds to the state 628, where the first station 511 terminates or backs off from its attempt to transmit A/V data and loops back to the state 623, where it again listens to the channel for periodic CBI messages and generates another LCTO report to be sent to the coordinator 112. If the answer to the query for the decision state 629 is yes (available bandwidth), the process 600 proceeds to a state 631, where the first station 511 transmits A/V data 503 accompanied by periodic RTS messages to the second station 512 at the allocated time slots. The process 600 ends at a state 633.

Figure 7:
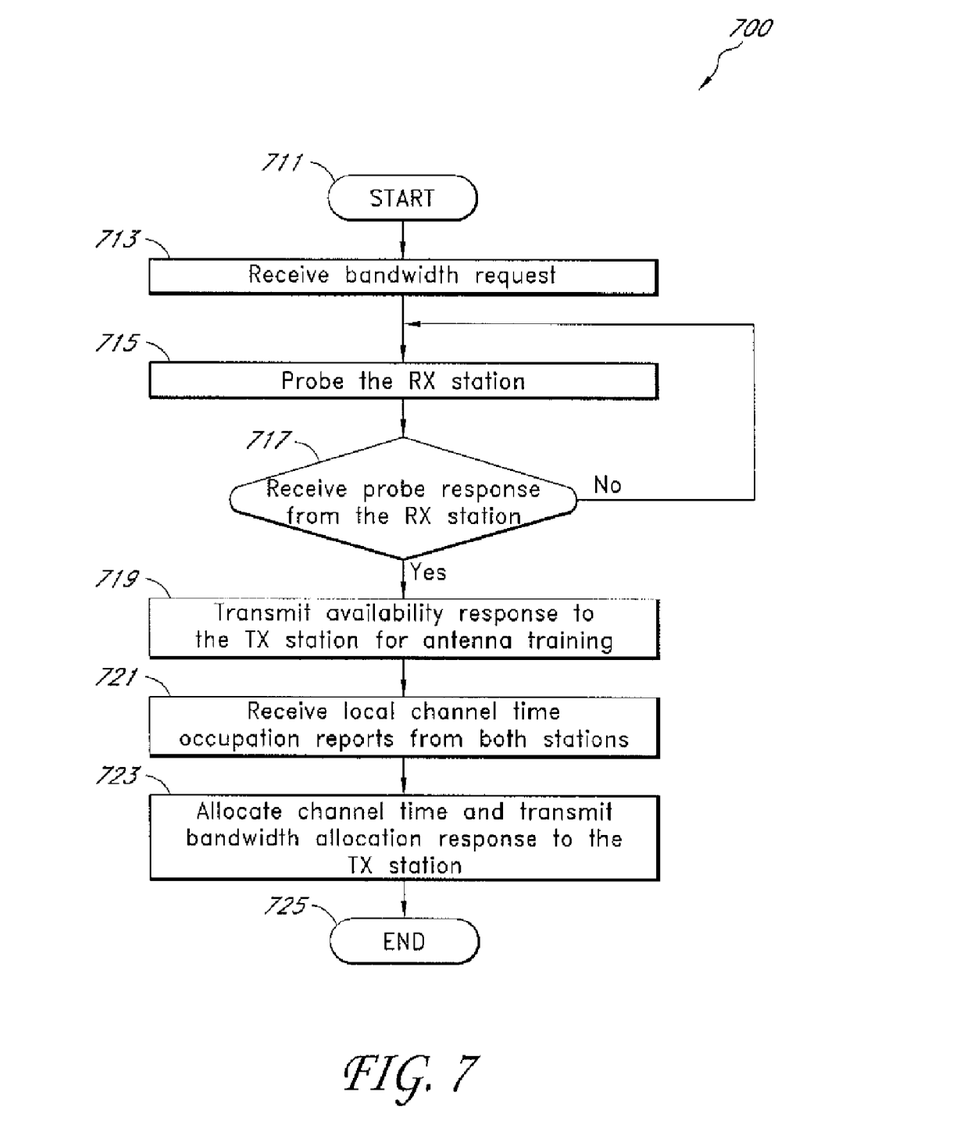
FIG. 7 is a flowchart illustrating an example process for a spatial reuse bandwidth reservation protocol from the point-of-view of a coordinator.

FIG. 7 is a flowchart illustrating an example process 700 for a spatial reuse bandwidth reservation protocol from the point-of-view of a coordinator station, e.g. the coordinator 112 (FIG. 5). Again, during the following discussion, frequent references will be made to stations and various data and message transmissions discussed above with respect to FIG. 5. The process 700 starts at a start state 711 and advances to a state 713, where the coordinator station 112 receives a bandwidth reservation request from the first station (STA1) 511. The process 700 proceeds to a state 71 5, where the coordinator station 112 probes the second station (STA2) 512 for its availability to receive data from and also, in some embodiments, to engage in antenna training with the first station 511 by transmitting a probe message to the STA2 512. The process 700 then proceeds to a decision state 717, where it is queried whether the coordinator 112 has received a probe response from the STA2 512. If the answer is no, the process 700 loops back to the state 715, where the coordinator 112 transmits another probe message to the STA2 512.

If the answer to the query for the decision state 717 is yes (the probe response received), the process 700 proceeds to a state 719, where the coordinator 112 transmits an availability response to the STA1 511. Before transmitting the availability response, the coordinator may allocate a time period reserved for antenna training for the two stations by allocating blocks of time, e.g., channel time blocks (CTBs). The allocated blocks may span several super-frames. The availability response indicates to the STA1 511 that the STA2 512 is available to receive data from the first station 511 and, in some embodiments, include the time period reserved for the antenna training. The process 700 proceeds to a state 721, where the coordinator 112 receives local channel time occupation (LCTO) reports from both STA1 and STA2 511, 512. The process 700 proceeds to a state 723, where the coordinator 112 analyzes the LCTO reports and allocates available channel time slots, e.g., CTB blocks, and transmits a bandwidth allocation response to the first station 511. In certain embodiments, the bandwidth allocation response 509 can be integrated into the beacon portion of a superframe. Process 700 ends at a state 725.

In some embodiments, instead of relying on the STA2 512 to tell the coordinator whether it is busy or idle, the coordinator 112 makes its own determination, and, if the STA2 512 is idle, the coordinator 112 transmits a connection request to the STA2 and allocates blocks of time for antenna training for the STA1 and STA2 511, 512. This is possible because in the infrastructure mode, the coordinator, being responsible for bandwidth reservations of all stations in the wireless network, knows whether a particular station is idle or busy.

Figure 8:
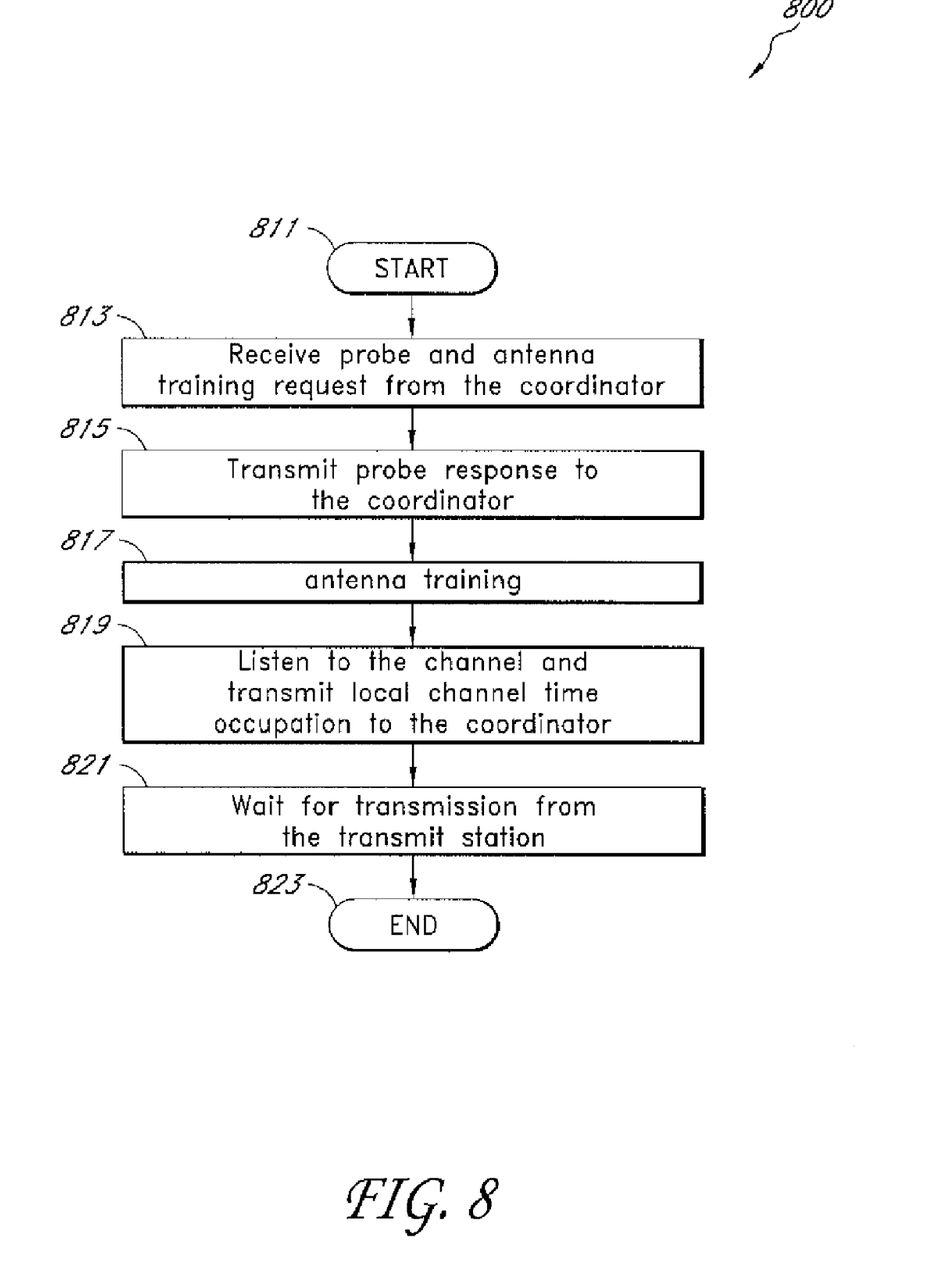
FIG. 8 is a flowchart illustrating an example process for a spatial reuse bandwidth reservation protocol from the point-of-view of a receiver.

FIG. 8 is a flowchart illustrating an example process 800 for a spatial reuse bandwidth reservation protocol from the point-of-view of a receiver, e.g., the second station (STA2) 512 (FIG. 5). Again, during the following discussions, frequent references will be made to various stations and data and message transmissions discussed above with respect to FIG. 5. The process 800 starts at an initial state 811 and advances to a state 813, where the STA2 512 receives a probe message from the coordinator station 112 inquiring about its availability for receiving data. The probe message may include an address of a first station (STA1) 511 from which the data is to be transmitted. In some embodiments, the probe message further includes or is accompanied by a request to perform antenna training with the STA1 511. The process 800 then proceeds to a state 815, where STA2 512 transmits a probe response message to the coordinator 112 indicating whether it is or is not available to receive data from and/or perform antenna training with the STA2 511.

Assuming that the STA2 512 is available to receive data from and to perform antenna training with the STA1 511, the process 800 proceeds to a state 817, where the antenna training is performed as between the STA1 and STA2 511, 512. The process 800 then continues to a state 819, where the second station 512 listens to the local channel for periodic CBI messages transmitted by other stations in the wireless network and generates and transmits a local channel time occupation (LCTO) report to the coordinator 112. The process 800 proceeds to a state 821, where the STA2 512 waits for transmission of data, e.g., A/V data 503 from the STA1 511. In certain embodiments, the STA2 512 may have received a bandwidth allocation message from the coordinator 112 indicating when such transmission from the first station 511 is scheduled to occur. Process 800 ends at a state 833.

Figure 9:
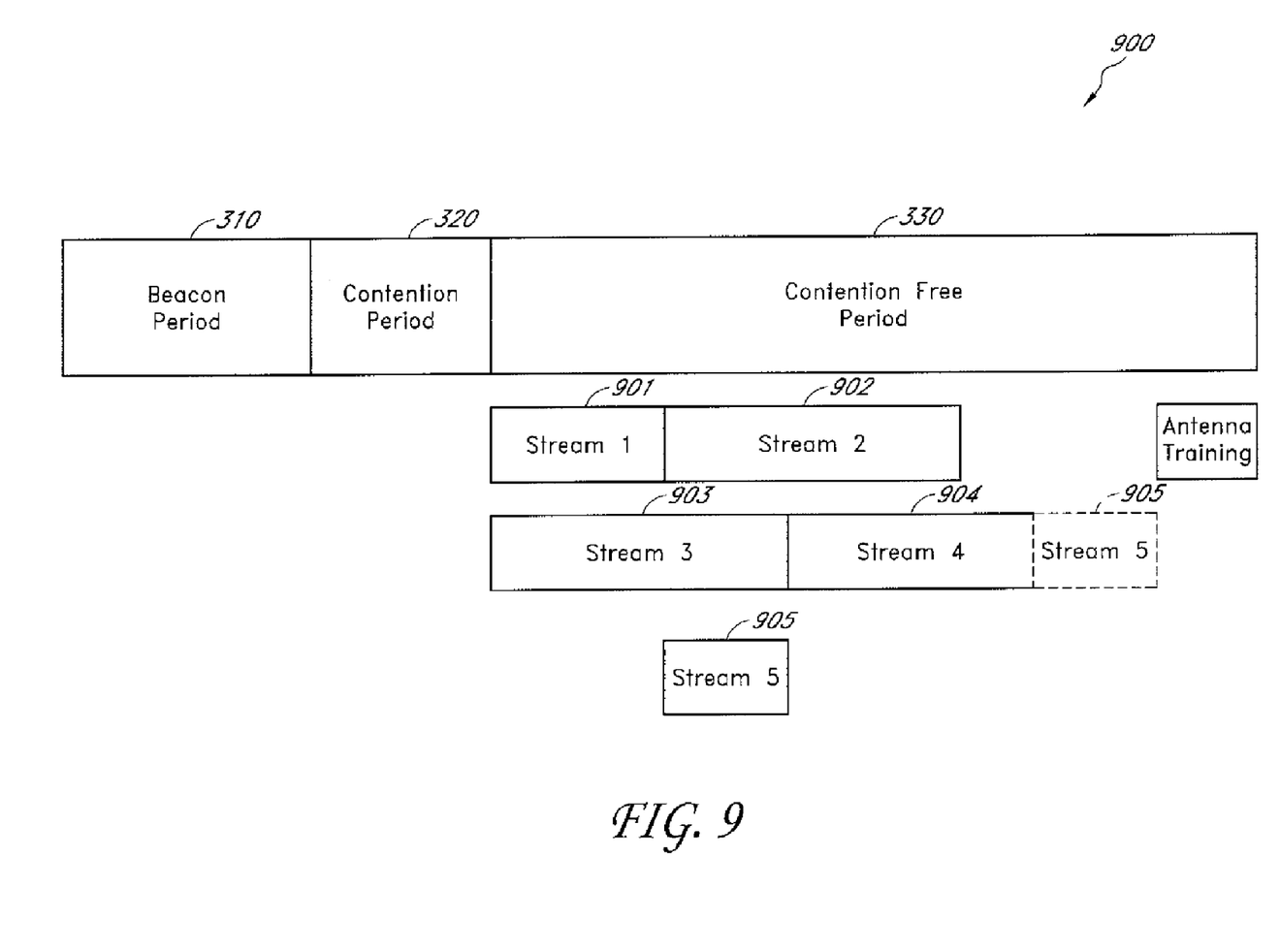
FIG. 9 is a schematic diagram illustrating scheduling of data streams for one superframe under the spatial reuse protocol.

FIG. 9 is a schematic diagram illustrating scheduling of data streams for one superframe under the spatial reuse bandwidth reservation protocol such as discussed above with respect to FIGS. 5-8. In the example shown, the coordinator 112, after receiving local channel time occupation reports, schedules the reservation of data streams 901-905. As shown in FIG. 9, Stream 1 901 and Stream 2 902 can interfere with each other; Stream 3 903 and Stream 4 904 can interfere with each other, and Stream 1 901, Stream 5 905 and Stream 4 904 can interfere with each other. So these streams need to share the time frame. On the other hand, Streams 1 and 3 can be transmitting simultaneously because they are spatially apart. For the same reason, Streams 2, 3, and 5 can share the medium, and so do Streams 2 and 4. As an example, before establishing Stream 5, the coordinator receives reports from the transmitter and receiver that the local time occupation is the duration of Stream 1 and Stream 4, and subsequently schedules the Stream 5 accordingly. As shown in FIG. 9, Stream 5 905 can be at the position shown by the solid rectangle or the position shown by the dashed rectangle. In certain embodiments, the antenna training period needs to be scheduled at a time where it does not overlap with any other transmissions.

The above-described method of a spatial reuse bandwidth reservation protocol may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the receiver 112 or the sender 114 shown in FIG. 1 includes the computer readable recording medium and can also include a processor, controller, or other computing device.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of providing spatial reuse in a wireless network for communicating compressed or uncompressed video/audio, the method comprising:
   transmitting a bandwidth reservation request for data communication with a receiver to a coordinator;
   receiving a first response indicating availability of the receiver for the data communication;
   listening to a local channel for channel busy indication (CBI) messages transmitted by other stations in the wireless network;
   forming a local channel occupation report by the receiver based on the CBI messages, wherein the local channel occupation report comprising data indicative of one or more time periods during which one or more stations in the wireless network other than the receiver are scheduled to transmit data messages to the coordinator that can interfere with data communication by the receiver;
   transmitting the local channel occupation report from the receiver to the coordinator;
   receiving a second response comprising data indicative of one or more allocated channel time slots scheduled by the coordinator based on the local channel occupation report; and
   simultaneously transmitting audio and/or video (A/V) data by multiple stations to the receiver during the one or more allocated channel time slots while sharing a same frequency band channel.

2. The method of claim 1, wherein at least one of the allocated channel time slots is also allocated for other non-interfering stations in the wireless network.

3. The method of claim 1, wherein the bandwidth reservation request is transmitted during a contention period of a superframe.

4. The method of claim 1, wherein the first response comprises data indicative of a time period reserved for antenna training.

5. The method of claim 1, further comprising performing iterative antenna training at a time period reserved for antenna training.

6. The method of claim 1, wherein the CBI messages comprise a Request-To-Send (RTS) message.

7. The method of claim 1, wherein the CBI messages comprise a Clear-To-Send (CTS) message.

8. The method of claim 1, wherein the available channel time slots comprise one or more channel time blocks (CTBs).

9. The method of claim 1, further comprising periodically transmitting RTS messages.

10. The method of claim 1, wherein time slots previously allocated for transmission by the stations in the wireless network other than the receiver are determined for receiving A/V data by the receiver without interference from the stations in the wireless network other than the receiver.

11. The method of claim 1, wherein the time slots previously allocated for transmission by the stations in the wireless network other than the receiver are reused for the receiver.

12. The method of claim 1, wherein the local channel occupation report is used by the coordinator for scheduling transmission for spatial reuse by multiple stations on a same frequency channel during the one or more allocated channel time slots.

13. The method of claim 1, wherein each of the multiple stations forms a local channel occupation report and transmits the local channel occupation report to the coordinator.

14. The method of claim 1, wherein the receiver only receives CBI messages transmitted by a portion of the other stations in the wireless network due to a geometrical arrangement of the other stations in the wireless network.

15. The method of claim 8, wherein the CTBs include one or more CTBs allocated for non-interfering data streams from one or more other stations in the wireless network.

16. The method of claim 12, wherein the coordinator determines available time slots that the receiver can receive data communication without interference based on the local channel occupation report.

17. The method of claim 14, wherein the local channel occupation report is used by the coordinator for scheduling transmission for spatial reuse by multiple stations on a same frequency channel during a same allocated channel time slot.

18. A method of providing a spatial reuse in a wireless network for communicating compressed or uncompressed audio/video, the method comprising:
   receiving a bandwidth reservation request from a transmitter for data communication with a receiver;
   determining that the receiver is available for data communication;
   transmitting a first response indicating availability of the receiver to the transmitter;
   receiving local channel time occupation reports formed by each of the receiver and the transmitter, the local channel time occupation reports comprising data indicative of one or more time periods during which one or more stations other than the transmitter and the receiver in the wireless network are scheduled to transmit data messages that can interfere with data communication by the transmitter and the receiver; allocating a bandwidth for the data communication between the transmit and receivers a coordinator based at least in part on the local channel time occupation reports; and
   transmitting to the transmitter a second response comprising data indicative of one or more allocated channel time slots scheduled by the coordinator based on the local channel occupation reports to the transmitter, wherein multiple non-interfering stations transmit data simultaneously while sharing a same frequency band channel.

19. The method of claim 18, wherein at least one of the allocated channel time slots is also allocated for other non-interfering stations in the wireless network.

20. The method of claim 18, wherein the first response comprises data indicative of a time period reserved for antenna training.

21. The method of claim 18, wherein allocating the bandwidth comprises determining one or more available channel time slots based at least in part on the local channel occupation report.

22. The method of claim 18, wherein the local channel time occupation report comprising data indicative of one or more time periods during which one or more other stations in the wireless network are scheduled to transmit data messages that may interfere with transmissions by the transmitter and receptions by the receiver.

23. A method of providing a spatial reuse in a wireless network for communicating compressed or uncompressed audio/video, the method comprising:
   receiving a probe inquiring availability for data communication with a transmitter;
   transmitting a probe response indicating availability;
   listening to a channel for channel busy indication (CBI) messages transmitted by one or more other stations in the wireless network;
   forming a local channel occupation report by the transmitter, wherein the local channel occupation report comprising data indicative of one or more time periods during which one or more stations other than the transmitter in the wireless network are scheduled to transmit to the coordinator that can interfere with data communication by the transmitter;
   transmitting the local channel occupation report to a coordinator from the transmitter; and
   waiting for transmission of audio and/or video (A/V) data from the transmitter during one or more allocated channel time slots scheduled by the coordinator based on the local channel occupation report, wherein multiple non-interfering stations transmit A/V data simultaneously while sharing a same frequency band channel during the one or more allocated channel time slots.

24. The method of claim 23, further comprising performing antenna training with the transmitter at a reserved time period.

25. The method of claim 23, further comprising periodically transmitting CTS messages.

26. A system for providing spatial reuse in a wireless network for communicating uncompressed video, the system comprising:
   a processor configured to:
      transmit a bandwidth reservation request for data communication with a receiver to a coordinator,
      receive a first response indicating availability of the receiver for the data communication,
      listen to a channel for channel busy indication (CBI) messages transmitted by other stations in the wireless network,
      forming a local channel occupation report by the receiver, wherein the local channel occupation report comprising data indicative of one or more time periods during which one or more stations other than the receiver in the wireless network are scheduled to transmit interfering data messages to the coordinator that can interfere with data communication by the receiver,
      transmit the local channel occupation report to the coordinator, and
      receive a second response comprising data indicative of one or more allocated channel time slots scheduled by the coordinator based on the local channel occupation report; and
   an antenna or an antenna array in data communication with the processor that transmits audio and/or video (A/V) data during the one or more allocated channel time slots, wherein multiple non-interfering stations transmit A/V data simultaneously during the one or more allocated time slots while sharing a same frequency band channel.

27. The system of claim 26, wherein the antenna or the antenna array includes a directional antenna, wherein the processor is further configured to train the directional antenna.

28. A system for providing a spatial reuse in a wireless network for communicating compressed or uncompressed audio/video, the system comprising:
    a processor configured to:
        receive a bandwidth reservation request from a transmitter for data communication with a receiver,
        determine that the receiver is available for data communication, transmit a first response indicating availability of the receiver to the transmitter,
        form local channel occupation reports by the receiver and the transmitter based on channel busy indication (CBI) messages transmitted by other stations in the wireless network, wherein the local channel occupation reports comprising data indicative of one or more time periods during which one or more stations in the wireless network other than the receiver and the transmitter are scheduled to transmit data messages to the coordinator that can interfere with data communication by the receiver;
        receive the local channel time occupation reports from at least one of the transmitter and receiver by a coordinator, and
        allocate bandwidth for the data communication between the transmitter and the receiver based at least in part on the local channel time occupation reports, and transmit a second response comprising data indicative of the allocated bandwidth to the transmitter, wherein the allocated bandwidth is scheduled by the coordinator based on the local channel occupation report; and
    an antenna or an antenna array in data communication with the processor that communicates control data with the transmitter and the receiver, wherein multiple non-interfering stations transmit data simultaneously while sharing a same frequency band channel during the allocated bandwidth.

29. The system of claim 28, wherein the processor is further configured to perform bandwidth reservations for all stations in the wireless network.

30. A system for providing a spatial reuse in a wireless network for communicating compressed or uncompressed video, the system comprising:
    a processor configured to:
        receive a probe inquiring availability for data communication with a transmitter,
        transmit a probe response indicating availability, listen to a channel for channel busy indication (CBI) messages transmitted by other stations in the wireless network,
        form a local channel occupation report by the transmitter, wherein the local channel occupation report comprising data indicative of one or more time periods during which one or more stations other than the transmitter in the wireless network are scheduled to transmit data messages to the coordinator that can interfere with data communication by the transmitter,
        transmit the local channel occupation report to a coordinator from the transmitter, and
        wait for transmission of audio and/or video (A/V) data from the transmitter; and
    an antenna or an antenna array in data communication with the processor that receives audio and/or video (A/V) data from the transmitter, wherein multiple non-interfering stations transmit A/V data simultaneously while sharing a same frequency band channel during one or more allocated time slots scheduled by the coordinator based on the local channel occupation report.

31. A non-transitory computer-usable medium in a system for wireless communication of compressed or uncompressed audio/video having computer readable code comprising instructions for:
    transmitting a bandwidth reservation request from a physical (PHY) layer for data communication with a receiver to a coordinator;
    receiving a first response indicating availability of the receiver for the data communication;
    listening to a local channel for channel busy indication (CBI) messages transmitted by other stations in the wireless network;
    forming a local channel occupation report by the receiver, wherein the local channel occupation report comprising data indicative of one or more time periods during which one or more stations other than the receiver in the wireless network are scheduled to transmit data messages to the coordinator that can interfere with data communication by the receiver;
    transmitting the local channel occupation report to the coordinator from the receiver;
    receiving a second response comprising data indicative of one or more allocated channel time slots scheduled by the coordinator based on the local channel occupation report; and
    transmitting audio and/or video (A/V) data to the receiver during the one or more allocated channel time slots, wherein multiple non-interfering stations transmit A/V data simultaneously while sharing a same frequency band channel during the one or more allocated channel time slots.

* * * * *